United States Patent [19]

Duly et al.

[11] Patent Number: 4,961,772
[45] Date of Patent: Oct. 9, 1990

[54] METHOD AND APPARATUS FOR CONTINUOUSLY MELTING GLASS AND INTERMITTENTLY WITHDRAWING MELTED GLASS

[75] Inventors: Raymond K. Duly, Stone; James A. Flavell, Shifnal, both of United Kingdom

[73] Assignee: Toledo Engineering Co., Inc., Toledo, Ohio

[21] Appl. No.: 405,223

[22] Filed: Sep. 11, 1989

[30] Foreign Application Priority Data

Sep. 20, 1988 [GB] United Kingdom ............... 8822093

[51] Int. Cl.$^5$ ..................... C03B 5/00; C03B 5/18; C03B 5/26
[52] U.S. Cl. ........................ 65/134; 65/160; 65/179; 65/339; 65/347
[58] Field of Search ................. 65/134–136, 65/158, 160, 162, 178, 179, 324, 335, 337, 339, 342, 347

[56] References Cited

U.S. PATENT DOCUMENTS

| | | | |
|---|---|---|---|
| 1,538,229 | 5/1925 | Weaver | 65/134 |
| 1,669,676 | 5/1928 | Schneider | 65/136 |
| 1,898,039 | 2/1933 | Eckert | 65/134 |
| 2,512,761 | 6/1950 | Arbeit | 65/342 |
| 3,085,408 | 4/1963 | Arbeit | 65/179 |
| 4,113,461 | 9/1978 | Sturm | 65/324 |
| 4,424,071 | 1/1984 | Steitz et al. | 65/337 |

Primary Examiner—Joye L. Woodard
Attorney, Agent, or Firm—Hugh Adam Kirk

[57] ABSTRACT

A glass melting furnace comprises a base structure (6) defining a melting chamber (8) an intermediate chamber (10), and a working chamber (12), in which chambers heaters are located. An opening (22) is provided into the melting chamber (8), through which batch material may be deposited on the body of molten glass in the melting chamber. Glass flows from the melting chamber (8) through an outlet (26) at a lower part thereof, which may open into the intermediate chamber (10), and flows over a wier (30) from the intermediate chamber (10) into the working chamber. Located in the outer walls of the working chamber are working outlets (34), through which blowing irons or the like tools may be entered, for a manual withdrawal of molten glass from the chamber (12).

The rate of production of molten glass by the melting chamber (8) is lower than the rate of utilization, such that during a working shift the level of glass in the working chamber falls from a maximum level towards a minimum level, and outside the working shift (e.g. overnight) the level in the working chamber increases from the minimum level to a maximum level.

Overflow ducts (44) are provided, at locations which define the maximum level of glass in the working chamber i.e. a short distance below the locations of the working outlets (34).

17 Claims, 5 Drawing Sheets

1

METHOD AND APPARATUS FOR CONTINUOUSLY MELTING GLASS AND INTERMITTENTLY WITHDRAWING MELTED GLASS

BACKGROUND OF THE INVENTION

This invention is concerned with improvements relating to the melting of glass, particularly by a method involving the use of a furnace comprising a melting chamber wherein glass is continuously melted, and a working chamber from which molten glass is discontinuously withdrawn such as from time to time. The invention is particularly concerned with the melting of glass for use in the production of hand made articles, or in a hand shop molten glass being withdrawn from the working chamber as it is required for use by an artisan for the production of an article.

The term "glass" is used herein generically, and includes a variety of heat fusable vitreous materials of differing compositions.

A convenient form of glass melting furnace comprises a melting chamber containing a body of molten glass, heating means in the chamber to supply heat to the molten glass, and means to deposit solid state batch material generally onto the top of the body of molten glass such as in a cold top melter. The batch material is progressively melted from the lower surfaces of the layer, whilst molten glass flows from an outlet of the furnace chamber into a working chamber, fresh batch material being continuously supplied to the top of the melting chamber to retain the layer of batch material at a desired depth. Such a furnace is a cold top type of continuous melter with a working chamber from which molten material is intermittently withdrawn and hereinafter referred to as being of the kind specified.

Molten glass is withdrawn for use in a production process, (which may be manual or automatic) from the working chamber; if desired an intermediate chamber may be located between the melting chamber and the working chamber.

Furnaces of the kind specified are well suited to continuous, uniform production, and whilst efforts have been made to enable the output of such furnaces to be varied, it has not proved possible satisfactorily to utilise such furnaces in circumstances where the requirement for glass varies widely, particularly in a way in which the temperature of the furnace is not subjected to potentially damaging fluctuations. This is particularly the case where the heating means comprises electrodes to heat the body of molten glass by the Joule effect.

In particular, in the production of hand made articles, it has heretofor been generally necessary, when using a glass melting furnace of the kind specified, to work a full three shift system, which is in many instances unacceptable or unsatisfactory.

SUMMARY OF THE INVENTION

According to this invention there is provided a method of operating a furnace of the kind specified, wherein during a normal days' working the volume of molten glass in the working chamber is generally reduced over a working shift, and is increased during a non-working shift.

Thus when operating on a single shift (8 hour) system, the relationship between V, the volume of the working chamber, P, the daily production rate of glass from the melting chamber, and R, the daily rate of utilisation of glass will be approximately as follows:

$$V = \tfrac{2}{3}P + C; \text{ and } R = \tfrac{1}{3}P + V;$$

the volume of glass in the working chamber being reduced to a minimum volume C at the end of a shift and being increased to a maximum by the commencement of the following shift.

For days without working (such as Sundays) drainage outlets may be provided for excess glass to flow from the working chamber when it is full, the glass being allowed to solidify and subsequently being reintroduced into the melting chamber as cullett.

Desirably the glass is continuously stirred in the working chamber, conveniently by a stirrer operative adjacent to the surface of the glass in the working chamber. Thus preferably a stirrer is used which follows the level of the glass in the working chamber, to retain a position just below the surface as the glass level in the chamber rises and falls.

Desirably the body of the molten glass in the working chamber is heated by heating means operative in conjunction with sensor means. Desirably the heating means comprises electrical heating means, including electrodes in the working chamber, below the minimum level, and desirably also means to direct heat to the surface of the body of molten glass in the working chamber.

Preferably molten glass is introduced into the working chamber (either direct from the melting chamber, or preferably from an intermediate retaining/holding chamber) into a lower region of the working chamber, preferably below the minimum permissable level therein.

Desirably, where glass flows into the working chamber from an intermediate chamber, a wier is provided over which molten glass flows during passage from the melting chamber to the working chamber, to maintain dynamic pressures or constant level of the molten glass in the melter as the level in the working chamber rises and falls.

Desirably the molten glass in the intermediate chamber is heated by heating means operating in conjunction with temperature sensors, and desirably said heating means comprises electrical heating means, including electrodes in the intermediate chamber below the level of glass therein, and desirably also means to direct heat to the surface of the body of molten glass in the intermediate chamber.

According to this invention there is also provided a furnace of the kind specified, adapted specifically to enable the furnace to be utilised in a shift system comprising at least one working shift and at least one non-working shift.

Preferably the furnace comprises one or more of the following features:

(a) drainage or overflow means extending from the working chamber at a location defining a maximum working level of the working chamber;

(b) an inlet for the flow of molten glass into the working chamber which is located at a level below a minimum operative level of the working chamber;

(c) an intermediate chamber between the melting chamber and the working chamber, preferably the intermediate chamber being provided with a wier over which glass flows as it passes in the direction from the melting chamber to the working chamber;

(d) stirring means for stir the body of molten glass in the working chamber at least adjacent to the surface of the body of molten glass, and preferably sensing means which is responsive to the level of molten glass in the working chamber which causes the stirring means to rise and fall with rise and fall of the level of molten glass;

(e) heating means to heat the body of molten glass in the working chamber, desirably operating in conjunction with temperature sensors. Desirably the heating means comprises electrical heating means, including electrodes in the working chamber below the minimum operative level of molten glass in the working chamber, and desirably also means to direct heat (such as radiant heat) to the surface of the body of molten glass in the working chamber;

(f) heating means in the intermediate chamber, desirably operating in conjunction with temperature sensors, and preferably including electrical heating means below the level of molten glass, and desirably also means to direct heat (such as radiant heat) to the surface of the body of molten glass in the intermediate chamber;

(g) roof means substantially completely to enclose the working chamber. Thus, other than for the provision of a continuously-open drainage channel, enabling surplus molten glass to be ducted from the working chamber in the event that it is completely filled, preferably the working chamber is enclosed by a refractory roof structure and preferably means is provided (such as by the provision of plugs or stoppers) to close the outlets through which glass is withdrawn from the working chamber for use.

According to this invention there is also provided a glass melting furnace of the kind specified, comprising one or more of the features (a), (b), (c), (d), (e), (f) and (g) set out above.

There will now be given a detailed description, to be read with reference to the accompanying drawings, of two glass melting furnaces which have been selected for the purposes of illustrating the invention by way of an example.

DETAILED DESCRIPTION OF THE PREFERRED EMBODIMENT

Figure 1:
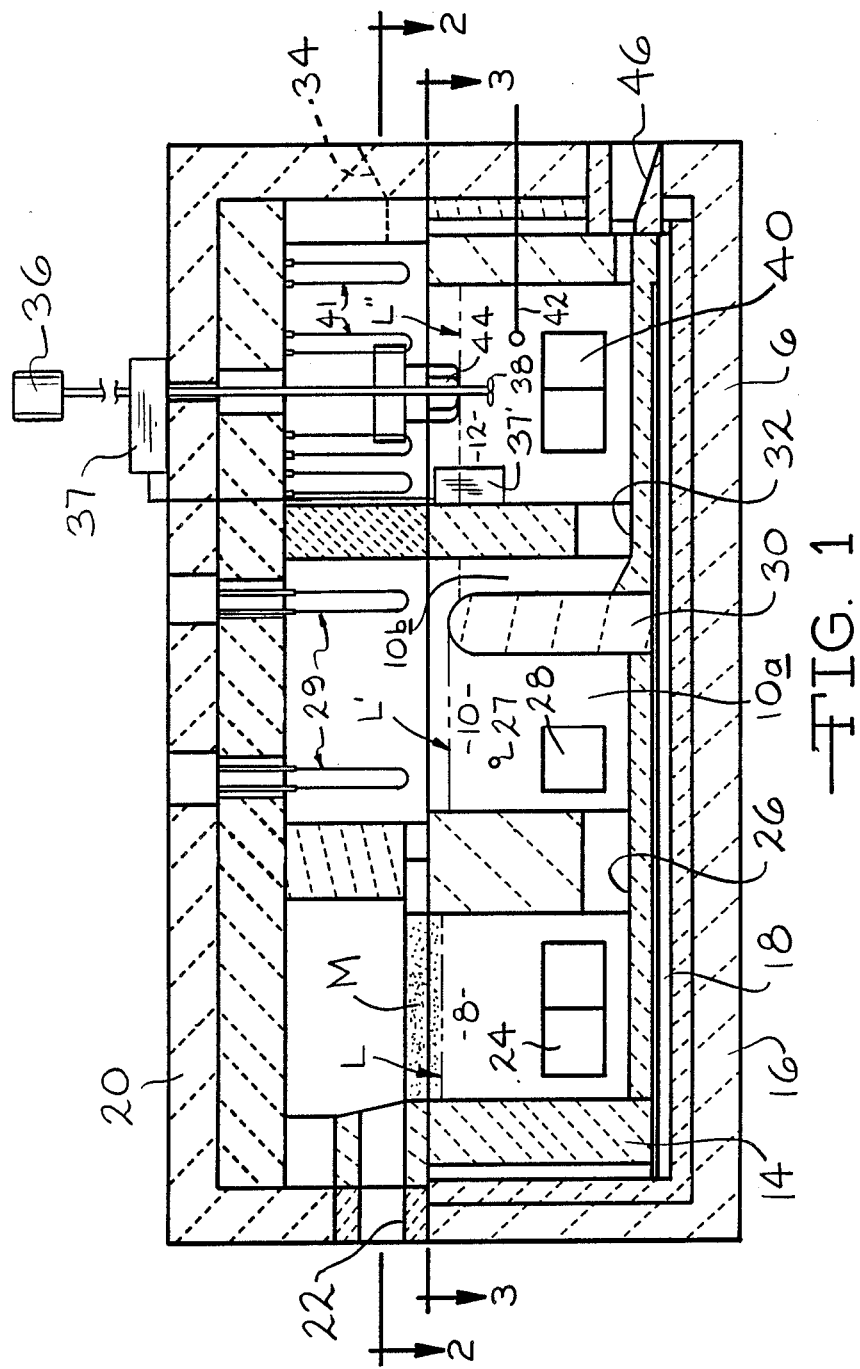
FIG. 1 is a vertical sectional view taken along line 1—1 of the furnace shown in FIG. 2 which is the first embodiment of this invention.
Figure 2:
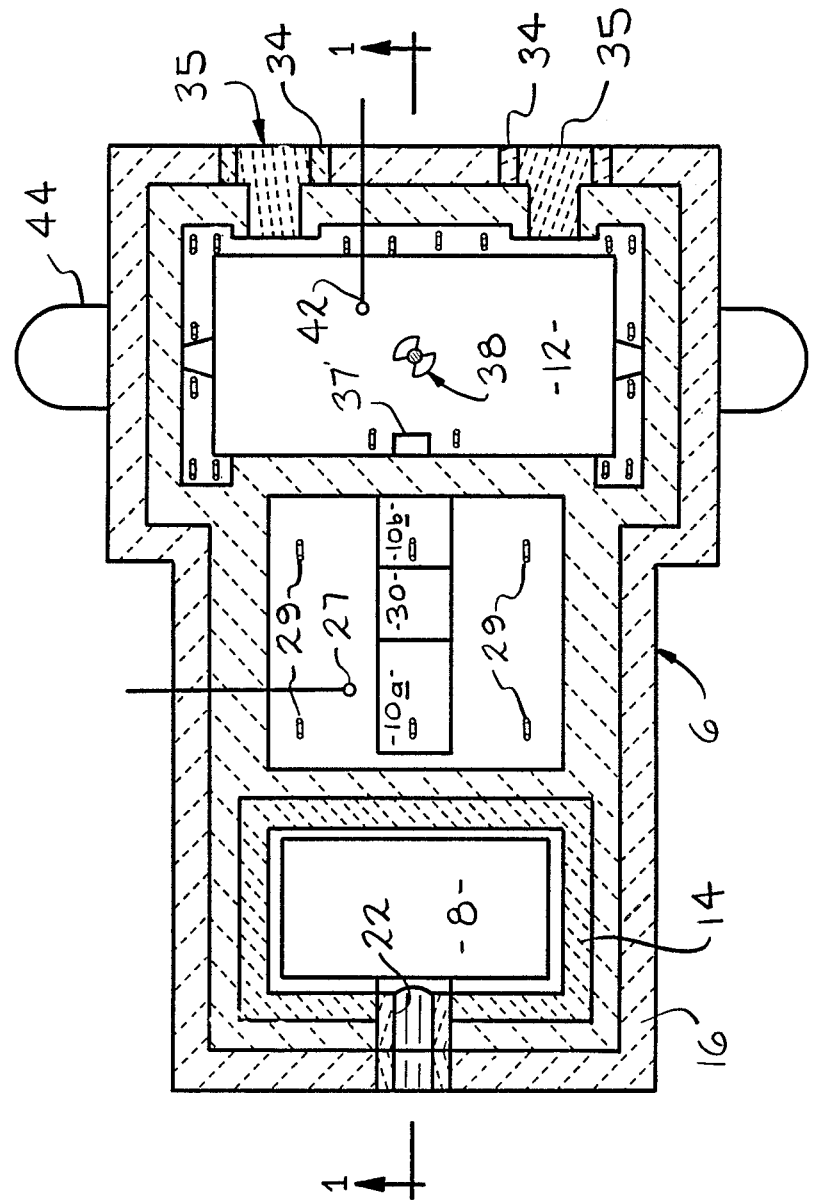
FIG. 2 is a horizontal sectional view taken along line 2—2 of the furnace shown in FIG. 1.
Figure 3:
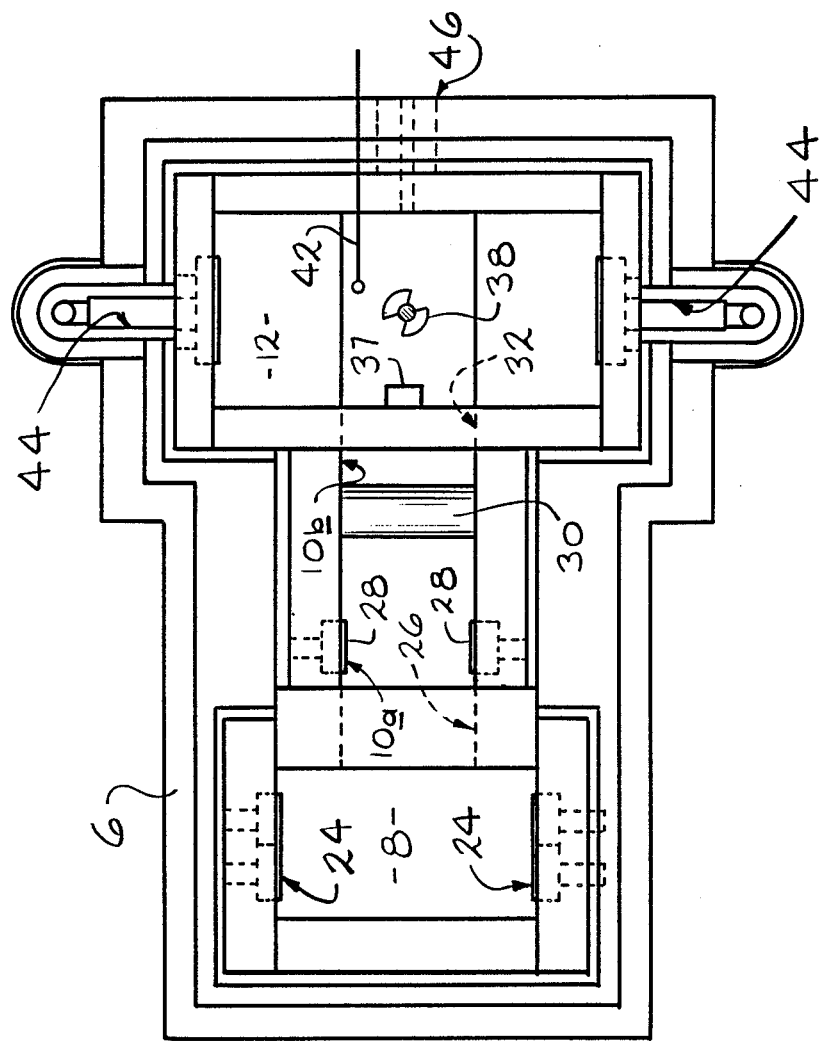
FIG. 3 is a horizontal sectional view taken along line 3—3 of FIG. 1.
Figure 4:
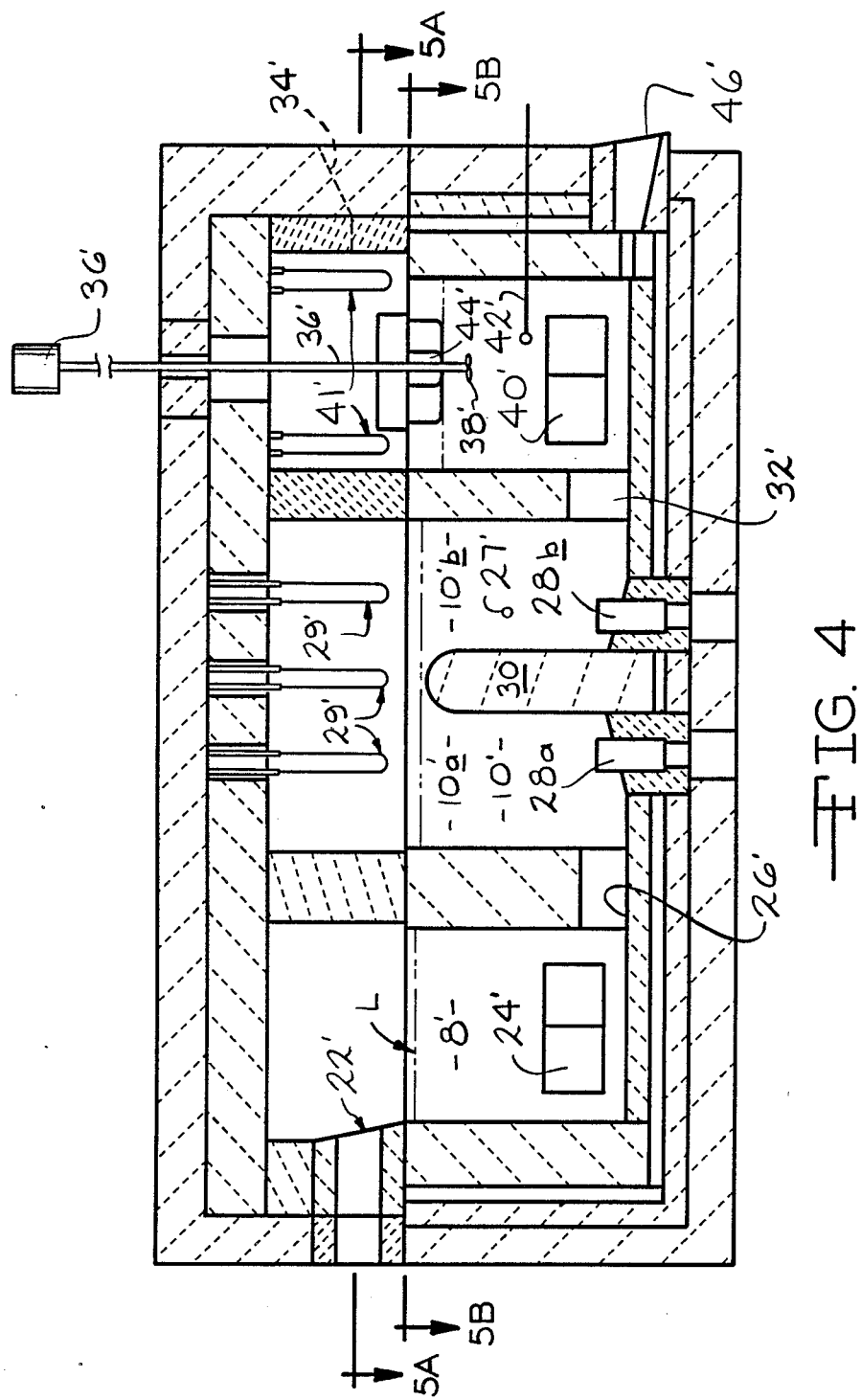
FIG. 4 is a vertical sectional view taken along line 4—4 of FIG. 5 of the furnace which is the second embodiment of the invention.
Figure 5:
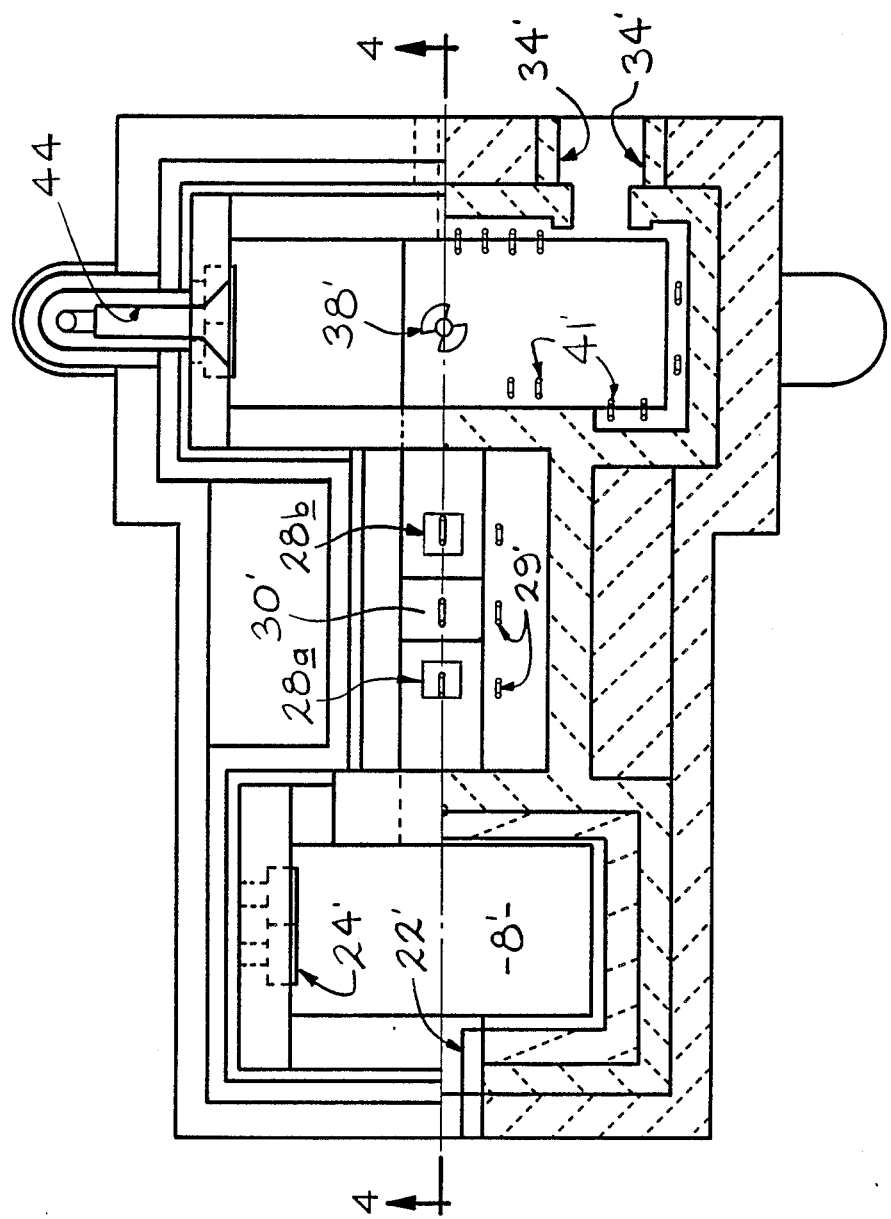
FIG. 5 is upper and lower half horizontal sectional views corresponding to FIGS. 2 and 3 taken along lines 5a–5a and line 5b–5b of FIG. 4, respectively, of the second embodiment.

The furnace which is the first embodiment of this invention comprises a base structure 6 defining a melting chamber 8, an intermediate chamber 10, and a working chamber 12, the base structure comprising an inner layer 14 of an AZS refractory, an outer layer 16 of refractory brick, and an intermediate bedding layer 18, conveniently of a bedding material such as Ersol.

Mounted on the base structure is a roof structure 20, effectively enclosing the three furnace chambers.

Extending into the melting chamber 8 is an opening 22, through which batch material M, optionally comprising cullett, may be deposited generally continuously on the body of molten glass at level L within the melting chamber, conveniently by mechanical means if desired, to cover the body of molten glass to a uniformed depth. Located in the walls of the melting chamber are electrodes 24, such as of tin oxide. In use, passage of electrical current between the electrodes 24 heats the body of molten glass in the melting chamber 8 by the Joule effect, causing the blanket of batch material on the surface to be progressively melted, and assimilated continuously into the body of molten glass.

Extending from the melting chamber 8 at a lower part is an outlet 26, which opens into the intermediate chamber 10.

Extending upwardly from the floor of the intermediate chamber 10 is a wier 30, which extends to a level L' approximating to that of the interface between batch material M and molten glass L in the melting chamber 8. The wier 30 effectively divides the intermediate chamber 10 into an upstream or riser section 10a, wherein wall electrodes 28, controlled by a sensor 27, are located, and a downstream section 10b, from the base of which an outlet 32 extends into the bottom of the working chamber 12. Radiant heaters 29 extend downardly into the intermediate chamber 10 from the roof 20.

Located in the outer wall of the working chamber are working outlets 34, through which blowing irons or the like may be entered, for a manual withdrawal of molten glass from the chamber 12, conveniently located a short distance above (e.g. 25 mm) the maximum level of glass in the working chamber, as determined by the position of drainage or overflow channels 44.

Mounted in the roof structure is a stirrer assembly 36, comprising means 37 to raise and lower a head or paddle means 38 of the stirrer assembly. The stirrer assembly also comprises sensing means 37' to sense the level of molten glass in the working chamber, and to cause the head 38 to rise and fall with rising and falling movement of the level L" of molten glass, so as to retain the head 38 somewhat below the level L" of molten glass.

Located in the wall of the working chamber adjacent the bottom thereof are wall electrodes 40, and located in the roof of the furnace above the working chamber are a plurality of radiant heaters 41. As with the intermediate chamber, sensing means 42 is provided continuously to sense the temperature of the body of molten glass in the working chamber, and then to control the operation of the electrodes 40 and radiant heaters 41 accordingly.

In the use of the furnace which is the first embodiment of this invention, batch material introduced into the melting chamber 8 through the opening 22 is continuously melted, and flows through the outlet 26 in to the riser section 10a of the intermediate chamber, upwardly and over the wier 30; the glass being further conditioned or refined in the intermediate chamber during this process.

Glass will be withdrawn manually through the openings 34 from the body of molten glass in the working chamber, and during the working shift this volume will fall, being withdrawn at a rate which is greater than the constant rate of replenishment by freshly melted glass from the intermediate section. As the level falls, the stirrer head 38 is lowered, retaining the glass in good condition. As the shift progresses, the level will fall progressively, until it reaches the minimum level, marginally above the position of electrodes 40.

At the end of the shift, the openings 34 will be plugged with stoppers 35, to minimise lost heat, and continually melting glass by the melting chamber will replenish the reduced volume by the commencement of the following shift.

Thus, by the use of the invention, glass may be produced in the melting chamber, to flow into the working chamber, on a generally continuous basis, allowing both for the maintenance of a high quality of production, and for the maintenance of a generally unchanging temperature throughout extended periods of operation of the furnace, minimising any subjection of the furnace, particularly the walls and electrodes thereof, to potentially damaging thermal shock.

To cater for the circumstances where the working chamber 12 is filled to a desired level L" prior to commencement of the following shift (which may be caused by an extensive period between adjacent shifts, such as a weekend or Public Holiday, or by an under utilisation of glass during the previous shift) surplus glass may flow through the drainage or overflow channels 44 to a cooling area, within which the surplus glass solidifies, to be used subsequently as cullet. In addition, a main bottom drain 46 is provided, which will only be utilised when it is required to empty the chamber 12.

It has been found, surprisingly, that an adequate relationship between the volume of the melting chamber 8, and the rate at which fresh glass is melted, and the volume of the working chamber 12, and the rate at which glass is utilised, is such that a furnace may be provided in accordance with this invention which adequately copes with a withdrawal of glass over only an 8 hour shift, and the accumulation of glass during the following two shifts, or 16 hour period within which glass is not removed from the working chamber. In this manner, the benefits of a furnace of the kind specified may be utilised in glass making areas where previously this was not practical.

In addition, it has been found that the specific energy requirements (kilowatt hours per kilo) for the production of glass by the method in accordance with this invention is not significantly higher, and indeed may be less, than the energy requirements of a comparitive contemporary batch method.

The capability of almost wholly enclosing the furnace, particularly during periods where glass is not being withdrawn from the working chamber, allow for relatively small heat losses, and the achievement of a more uniform and constant temperature distribution throughout the furnace, reducing damage caused to the furnace through the occurence of thermal shock.

The furnace which is the second embodiment is similar to the first embodiment above described, and similar numerals with an apostrophe (') are used to indicate equivalent parts. Primarily the furnace which is the second embodiment differs from the first in geometry, but additionally electrodes 28a and 28b are provided in both the riser section 10a' and the downstream section 10b' of the intermediate chamber 10'. These electrodes, as with the roof electrodes 29', control the temperature of glass as it flows through the intermediate chamber in response to temperature sensing device 27'. It has however been found that passage of electricity between the electrodes 24' and 28a through the outlet 26', and between the electrodes 28b and the electrodes 40' through the outlet 42', provides for the maintenance of a higher quality of glass in the working chamber.

We claim:

1. A method for melting solid material in a furnace having a melting chamber and a working chamber separated by a weir, comprising:
   (A) continuously feeding said solid material into said melting chamber,
   (B) continuously melting said material in said melting chamber,
   (C) maintaining a constant level of the melted material in said melting chamber by continuously flowing the melted material over a weir to said working chamber, and
   (D) withdrawing melted material from said working chamber during intermediate periods of time at a rate greater than the flow of material over said weir to said working chamber.

2. A method according to claim 1 including maintaining a predetermined temperature of said melted material in said working chamber.

3. A method according to claim 1 including overflowing said melted material from said working chamber to prevent the melted material from rising in said working chamber above a predetermined level which is below the constant level in said melting chamber and said weir.

4. A method according to claim 1 including stirring said melted material in said working chamber with a stirring means.

5. A method according to claim 4 including maintaining the stirring means at a constant depth below the surface of said melted material in said working chamber, regardless of the changes in level caused by difference in flow of said melted material into and out of said working chamber.

6. A method according to claim 1 wherein said melting in said melting chamber employs the Joule effect.

7. A furnace comprising:
   (1) a melting chamber including:
       (a) means for feeding solid material into said melting chamber,
       (b) means for melting the solid material in said melting chamber, and
       (c) weir means for maintaining a predetermined level of the melted material in said melting chamber and for flowing said melted material from said melting chamber, and
   (2) a working chamber for receiving said melted material from said weir means, including:
       (a) at least one working outlet means for said melted material, and
       (b) an overflow outlet means slightly below said weir and said working outlet in said working chamber,
whereby said furnace may be used in a hand shop.

8. A furnace according to claim 7 including means for maintaining a predetermined temperature of said melted material in said working chamber.

9. A furnace according to claim 8 wherein said means for maintaining a predetermined temperature in said working chamber comprises electric heating means above and below the surface of said melted material.

10. A furnace according to claim 7 including stirring means in said working chamber for stirring said melted material.

11. A furnace according to claim 10 including means for adjusting said stirring means to maintain a predetermined position below the level of said melted material, regardless of the variations in said level.

12. A furnace according to claim 11 wherein said means for adjusting said stirring means includes a sensor for sensing the level of said melted material in said working chamber.

13. A furnace according to claim 7 including an intermediate chamber between said melting chamber and said working chamber, said intermediate chamber containing said weir means.

14. A furnace according to claim 13 wherein said intermediate chamber flows said melted material into the lower portion of said working chamber.

15. A furnace according to claim 7 wherein said working outlet means in said working chamber includes means for plugging said outlet means.

16. A furnace according to claim 7 wherein the means for melting said solid material in the melting chamber comprises electrodes employing the Joule effect.

17. A furnace according to claim 7 wherein said melting chamber and said working chamber are substantially wholly enclosed with a roof means.

* * * * *